Jan. 15, 1963
K. DAUGIRDAS
3,073,176
GEAR REDUCTION MOTOR
Filed April 7, 1959
3 Sheets-Sheet 1
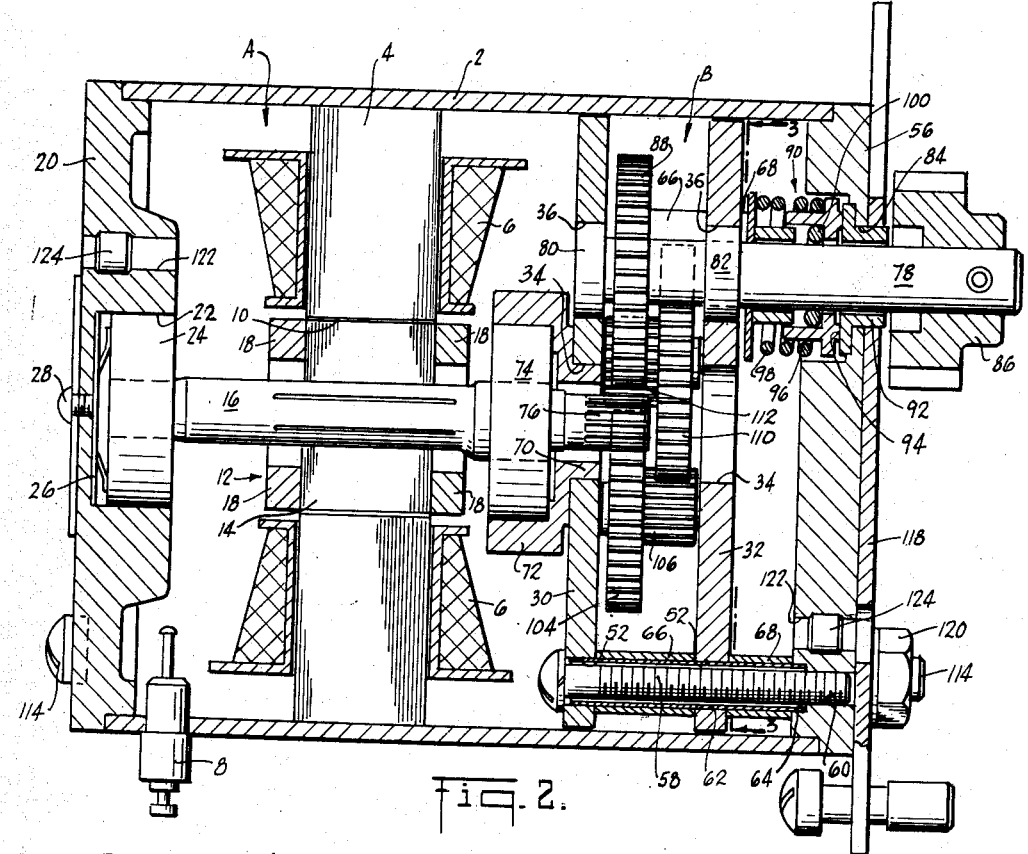
INVENTOR.
KRISTUPAS DAUGIRDAS
BY James R. Franklin
ATTORNEYS Jan. 15, 1963   K. DAUGIRDAS   3,073,176
GEAR REDUCTION MOTOR
Filed April 7, 1959   3 Sheets-Sheet 2

INVENTOR.
KRISTUPAS DAUGIRDAS
BY James R. Franklin
ATTORNEYS

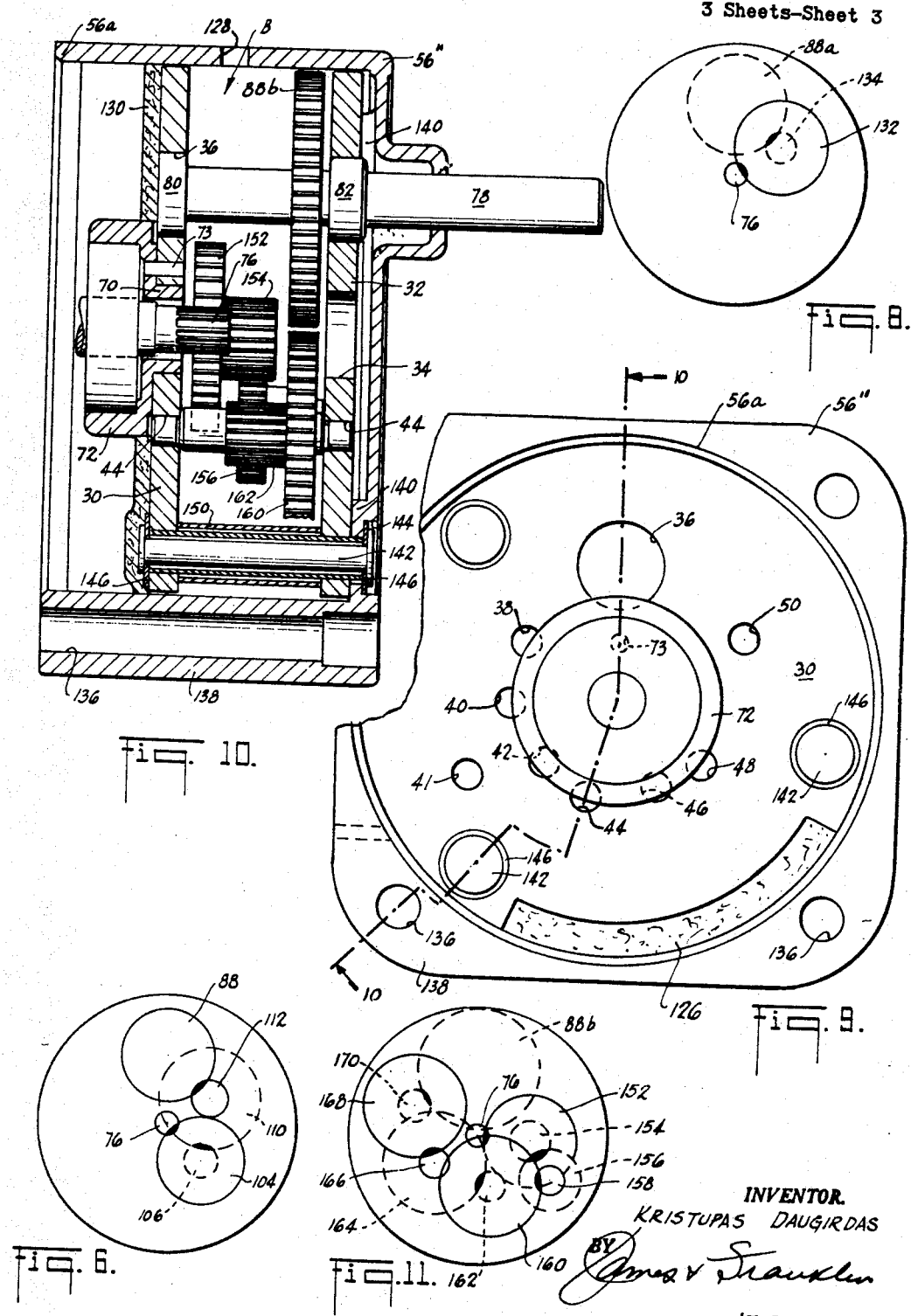

United States Patent Office 3,073,176
Patented Jan. 15, 1963

3,073,176
GEAR REDUCTION MOTOR
Kristupas Daugirdas, Dorchester, Mass., assignor to Holtzer-Cabot Corporation, a corporation of Delaware
Filed Apr. 7, 1959, Ser. No. 804,619
5 Claims. (Cl. 74—421)

The present invention relates to the construction of a combination electric motor and gear reduction unit.

Electric motors, by reason of their electrical construction, usually must rotate at fairly high speeds, e.g. 3600 r.p.m. There are many occasions where the device to be driven by the motor must be driven at a low speed, e.g. 60 r.p.m. In such instances speed reduction units, usually of the meshing gear type, are interposed between the driving shaft of the motor and the output shaft of the motor-gear reduction unit assembly.

In many instances the gear reduction units are assemblies manufactured separate from the motor but is adapted to be attached thereto. In other instances the reduction gear assembly is entirely separate from the motor and is interposed someplace in the external mechanical connection between the motor and the device being driven. In either case these separate reduction gear assemblies add considerably to the size and expense of the overall system, present their own problems in shaft journaling, lubrication and the like, and contribute markedly to the existence of undesired lost motion in the overall transmission, in part because they are units separate from the motor requiring great care and precision in alignment with and connection to the motor and in part because, except in special circumstances, they are not designed for use with a particular motor.

Attempts have been made to eliminate some of these operational disadvantages by building the gear reduction units together with the motor and incorporating both in a single housing. This approach has had some desirable operational effects, but the combined motor and reduction gearing has nevertheless been quite bulky and exceptionally expensive When a given motor and reduction gear arrangement is to be manufactured in very large quantities the additional cost, while still appreciable, can be bearable from a competitive point of view. However, when a given motor must be provided for different applications, and hence with a variety of reduction gear assemblies for output shaft rotation at different speeds, the additional cost involved in integrating the motor and gearing has been so large as to constitute a serious competitive factor.

The present invention has as its primary object the achievement of the operational advantages inherent in a unitary construction of motor and reduction gearing by means of a standard basic structural arrangement permitting a wide variety of speed reduction ratios. A second and perhaps an equally important object is to provide for such a construction which will greatly minimize cost.

Other important objects of the present invention are to produce a motor-gear reduction unit which provides for effective and reliable lubrication of the reduction gear train, which will ensure accurate alignment between the motor rotor and that gear train, which will provide for a fixed axial spacing between the driving shaft of the motor and the output shaft of the gear train, and which will provide double bearing support for the output shaft for increased radial load capability. Ready conversion of a motor from one output shaft speed to another is greatly facilitated through the use of standard interchangeable subassemblies which may be made up on order or stocked in inventory, as desired.

These and other objects are achieved by providing the unit with a subassembly defining one end of the unit, that subassembly comprising the reduction gearing and output shaft together with an end cap for the motor through which the output shaft extends. This sub-assembly preferably also includes a support for one end of the driving shaft of the motor, in which support that shaft is journaled. The gear reduction sub-assembly comprises a pair of preferably identical train plates provided with a plurality of registering apertures for mounting and journaling the reduction gear train, selection of appropriate gearing mounted in corresponding apertures permitting a wide variation in gear reduction ratio, for example, from 18/1 to 3600/1. Means are provided for aligning and spacing the train plates and for securing them to the motor end cap to form the readily attachable and detachable sub-assembly. The output shaft of the gear train is journaled in both of the train plates and thus is very reliably and strongly supported. The innermost of the train plates provides support and journalling for one end of the driving shaft of the motor, thus minimizing space and expense and ensuring accurate alignment of the driving shaft with the reduction gear train. The train plates are desirably formed of porous metal and are maintained in contact with a lubricant reservoir of appreciable capacity, thus reliably ensuring adequate lubrication of the gear train over an exceptionally long period of time. This reservoir may comprise an appreciable volume of lubricant with which the motor and/or gear train section is substantially filled, or it may comprise an absorbent body of felt or the like saturated with lubricant. The gearing may comprise integral pinions, gears and shafts for greater strength and reliability.

To the accomplishment of the above, and such other objects as may hereinafter appear, the present invention relates to the construction of a combined motor and reduction gear train and mounting therefor as defined in the appended claims and as described in this specification, taken together with the accompanying drawings, in which:

FIG. 1 is an end view of one embodiment of a reduction gear motor constructed according to the present invention;

FIG. 2 is a cross sectional view thereof taken along the line 2—2 of FIG. 1 and shown on an enlarged scale;

FIG. 3 is a view taken along the line 3—3 of FIG. 2, but on the scale of FIG. 1;

FIG. 6 is a schematic gearing diagram of the gearing illustrated in FIGS. 1–4;

FIG. 8 is a schematic diagram of the gear train illustrated in FIG. 7;

FIG. 9 is an elevational view of the reduction gear subassembly of yet another embodiment of the present invention, taken from the left hand end of FIG. 10, and with the sealing sheet 130 removed;

FIG. 10 is a cross sectional view taken along the line 10—10 of FIG. 9; and

FIG. 11 is a schematic diagram of the gear train in the embodiment of FIGS. 9 and 10.

FIGS. 1–5 illustrate the present invention as embodied in a combined motor and reduction gear unit adapted to be oil-filled and shows, in that unit, a gear train having a speed reduction ratio of 60/1, but it will be apparent, as the description proceeds, that it could also be employed in a non-oil-filled motor and that many different gear ratios could be employed.

Figure 4:
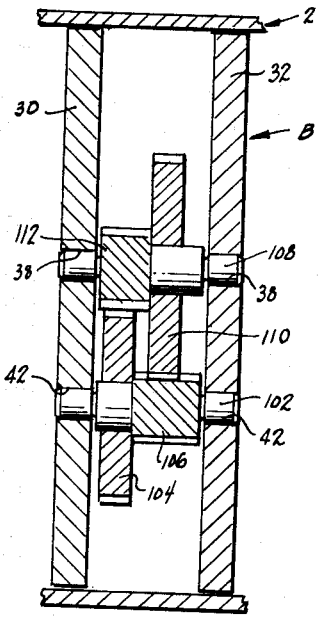
FIG. 4 is a cross sectional view taken along the line 4—4 of FIG. 3 but on the scale of FIG. 2.
Figure 5:
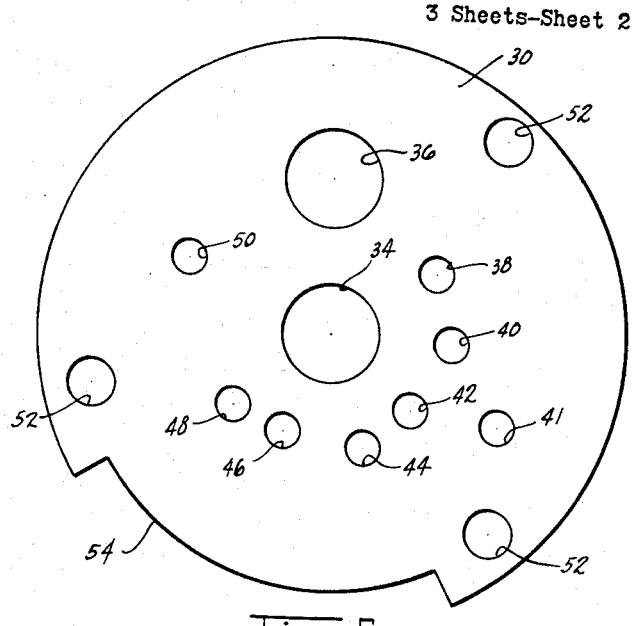
FIG. 5 is an elevational view of one of the train plates of FIG. 2.

The motor sub-assembly, generally designated A, comprises a housing ring 2 within which a laminated stator 4 is secured in any appropriate manner, that stator having, as is conventional, a plurality of windings 6 thereon, the ends of the windings being electrically connected to terminals 8 sealed in and extending through the ring 2. The stator 4 defines a central opening 10 within which the rotor generally designated 12 is adapted to be received and rotate, that rotor, in the form here specifically disclosed, being of the induction type and comprising a laminated magnetic structure 14 mounted on shaft 16 and having conductive bars (not shown) extending longitudinally therethrough and connected to conductive end rings 18 at both ends of the rotor 12. An end cap 20 is secured to and closes the left hand end of the ring 2, the inner surface of the end cap 20 being provided with a recess 22 within which a ball bearing 24 is received, the left hand end of the rotor shaft 16 being journaled in the bearing 24. A spring washer 26 is received between the bearing 24 and the inner end surface of the recess 22 so as to resiliently urge the bearing 24, and hence the rotor shaft 16, to the right as viewed in FIG. 2, a drive screw 28 being accessible from the exterior of the end cap 20 so as to permit the adjustment of the resilient force exerted by the spring washer 26 on the bearing 24.

The reduction gear sub-assembly, generally designated B, comprises a pair of preferably identical train plates 30 and 32 each provided with a large central opening 34, another large opening 36 thereabove, and a plurality of smaller openings 38, 40, 41, 42, 44, 46, 48 and 50 distributed therearound at carefully predetermined locations, for a purpose hereinafter to be described. A plurality of openings 52 are also formed in the plates 30 and 32 adjacent the periphery thereof, and an arcuate peripheral recess 54 of appreciable extent is also formed therein. These train plates 30 and 32 are adapted to be spaced from one another by an appropriate distance with their various apertures in registration, and to be secured by any appropriate means to the end cap 56 which closes the right hand end of the housing ring 2. In the form here specifically disclosed that means comprises the screws 58 which pass through the aligned openings 52 in the train plates 30 and 32 and which are threadedly received in the tapped apertures 60 formed in the end cap 56. The screws 58 are received inside steel shells 62 which also pass through the apertures 52 and terminate in countersinks 64 at the outer ends of the end cap apertures 60, and spacers 66 and 68 are interposed between the train plates 30 and 32 and the train plate 32 and end cap 56 respectively in order to provide for proper axial spacing between those elements.

Figure 7:
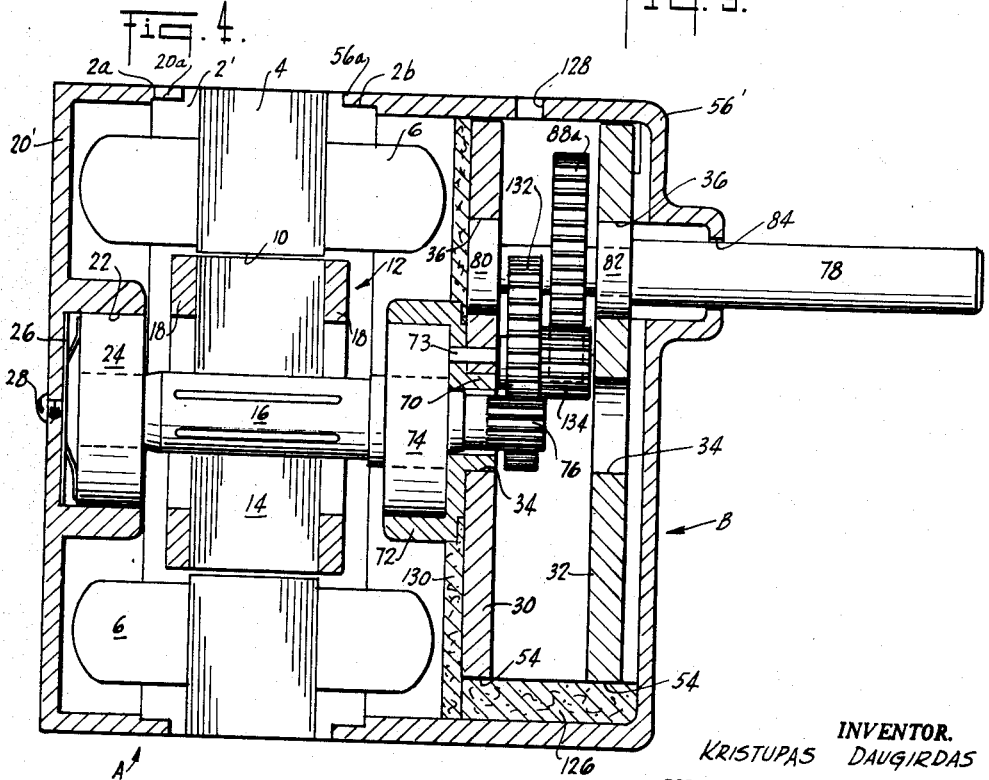
FIG. 7 is a view similar to FIG. 2 but of a second embodiment of the present invention and utilizing a different gear train, FIG. 7 representing an entirely vertical cross section of the unit.

The extending flange 70 of a cup 72 is secured within the central opening 34 of the axially innermost train plate 30 in any appropriate manner, as by press fitting and/or welding (or by means of the rolled stick pin 73 as shown in FIGS. 7 and 10), the cup 72 extending to the left of the train plate 30 as viewed in FIG. 2 and hence into the motor cavity. A bearing 74 is received within the cup 72, and the right hand end of the rotor drive shaft 16 is journaled in the bearing 74 and extends through the cup flange 70 to terminate in a pinion gear 76 located to the right of the train plate 30 and hence within the gear train cavity.

The output shaft 78 of the gear train is journaled in bearings 80 and 82 mounted in the registering apertures 36 of the train plates 30 and 32 respectively and extends out through an opening 84 in the end cap 56, a gear 86 or other driving element being secured to its extending end in any appropriate manner. Fast on the shaft 78, and located between the train plates 30 and 32, is a gear 88. In the form here specifically disclosed, where an oil-filled motor is involved, means must be provided for sealing the opening 84 in the end plate 56 while permitting rotation of the output shaft 78. A conventional means for that purpose is generally designated 90 and comprises a bushing 92 fixed to the end plate 56 and having a flat axially inner surface 94 against which a ring 96 rotates, spring 98 urging the ring 96 against the surface 94 and sealing ring 100 preventing leakage of oil along the shaft 78 inside the ring 96. The interengagement of the ring 96 with the surface 94 is such as to prevent any escape of oil therethrough.

The pinion 76 on the end of the motor driving shaft 16 and the gear 88 on the output shaft 78 do not, in the embodiment here illustrated, mesh with one another, although they could be constructed so to do where a very small degree of speed reduction is required. They are adapted to be operatively connected to one another by means of a gear train mounted on the train plates 30 and 32 by utilizing one or more of the apertures 38—50, depending upon the desired degree of speed reduction. In the form specifically shown in FIGS. 1–5, and as may best be seen from FIG. 4 and the schematic diagram of FIG. 6, a gear reduction ratio of 60/1 is accomplished through the use of a pair of gear and pinion units mounted in the gear plate apertures 38 and 42 respectively. In the apertures 42 is mounted a shaft 102 on which is a gear 104 which meshes with the pinion 76 on the motor driving shaft 16, the pinion 106 rotating therewith. In the train plate apertures 38 is journaled a shaft 108 on which is received a gear 110 which meshes with the pinion 106, the pinion 112 rotating therewith and meshing with the output shaft gear 88. In order to secure the desired 60/1 ratio the pinion 76 is provided with ten teeth, the gear 104 has forty-five teeth, the pinion 106 has twelve teeth, the gear 110 has forty-eight teeth, the pinion 112 has twelve teeth and the gear 88 has forty teeth.

The gear train and the end cap 56 on which it is mounted constitute a sub-assembly B manipulatable as such and constructed separate from the motor sub-assembly A. It is adapted to be inserted as a unit into the motor assembly A, by sliding it into the open right hand end of the motor sub-assembly A, the right hand end of the motor driving shaft 16 passing through the cup flange 70 and the bearing 74 seating itself within the cup 72. The gear train sub-assembly is adapted to be held in assembled condition on the motor sub-assembly A by means of the through bolts 114 the heads of which engage the end plate 20 and the tips of which are threadedly engaged in apertures 116 formed in the end plate 56. In the form here specifically disclosed a mounting plate 118 is affixed to the outer surface of the end plate 56 by means of nuts 120 which are threaded over the protruding tips of the through bolts 114.

In the embodiment of FIGS. 1–5 the entire motor-gear reduction unit is adapted to receive a bath of lubricant, usually up to about one-third of its internal volume. The end plates 20 and 56 are provided with apertures 122 to facilitate the oil insertion and atmosphere-control operations attendant thereupon, those apertures being sealed, when the filling is completed, by means of the set screws 124. This volume of lubricant ensures proper lubrication of all of the rotating parts of the overall assembly, and the train plates 30 and 32 are preferably of porous metal construction so that lubricant is drawn thereby to all of the bearings and journalling apertures above the level of the lubricant.

The embodiment of FIGS. 7 and 8 is fundamentally the same as that of FIGS. 1–5, and similar elements are provided with similar reference numerals. There are certain respects, however, in which the embodiment of FIGS. 7 and 8 differs from that of the preceding embodiment, and these will now be set forth, it being understood, however, that differences are in the main independent from one another, so that one, some or all of these differences could be embodied in a given installation without departing from the basic characteristics of the improved structure here disclosed.

In the embodiment of FIGS. 7–8 the motor stator 4 is provided with an integral mounting section 2' and the left hand end closure 20' is in the form of a shell the flange 20a of which is received within a peripheral recess 2a formed at the end of the integral stator mounting 2'. A similar peripheral recess 2b is formed at the other end thereof and the right hand end closure 56', to which the train plates 30 and 32 are secured, is also of shell form and has a flange 56a received in the recess 2b. The output shaft 78 extends out through the end closure 56' in unsealed relation thereto, this particular embodiment not being of the oil-filled type. In order to provide for lubrication of the reduction gear train in this embodiment a body 126 of felt or other oil-absorbent material is received within the peripheral cutouts 54 of the train plates 30 and 32 and preferably extends between the train plates, as shown, and an oil-filling opening 128 (for which a closure, not shown, is provided) is located at the top of the end closure 56', so that oil may be introduced into the reduction gear cavity, thereby to saturate the absorbent body 126. This body is, of course, in contact with the porous metal train plates 30 and 32, and thus constitutes an oil reservoir of substantial capacity which feeds those plates with lubricant, the lubricant being drawn by capillary action through the porous material of which the plates 30 and 32 are formed up to the apertures 34—50, thus providing for lubrication of the journals defined at such of those apertures as are used in any given installation. In order to separate the gear cavity from the motor cavity, provide a lubricant reservoir of greater capacity, and further ensure proper lubrication of all journalling apertures, a felt sheet 130 engages the axially inner surface of the train plate 30 and the radially inner surface of the end closure 56'.

The reduction gearing in the embodiments of FIGS. 7-8 provides for a speed reduction ratio of 18/1. To this end only the apertures 38 are employed, those apertures journalling a gear 132 having fifty teeth which meshes with the ten-tooth driving shaft pinion 76 and with which fifteen-tooth pinion 134 rotates, that pinion meshing with output shaft gear 88a having fifty-four teeth. This gear arrangement could, of course, be used equally as well in the embodiment of FIGS. 1–5, or in the additional embodiment hereinafter to be described.

FIGS. 9–11 illustrate yet another embodiment of the present invention, the differences between this embodiment and the previously described devices also being substantially independent of one another.

The embodiment of FIGS. 9–11 is similar to that of FIGS. 7–8 in that the end closure 56″ on which the gear train is mounted is of cup shape, and is adapted to be used in conjunction with a motor assembly A of the same general type as that in FIGS. 7–8, although the various parts thereof are adapted to be secured together by means of through bolts 114 which pass through apertures 136 formed in radial corner extensions 138 of the housing parts. The end wall of the end closure 56a is provided with bosses 140 against which the axially outer train plate 32 is adapted to seat, the train plates 30 and 32 being held to one another and to the end closure 56a by means of rivets 142 (which method of mounting and connection is also used in conjunction with the embodiment of FIGS. 7 and 8). The outer heads of the rivets 142 are received within recesses 144 formed in the outer surface of the end closure 56', washers 146 are interposed between the rivet heads and the surfaces against which they are adapted to press, the rivet is surrounded by a shell 148, and the train plates 30 and 32 are separated by spacer 150. It will be noted, by a comparison of FIG. 10 with FIGS. 2, 4 and 7, that the length of the spacer 150 is greater than the length of the spacers 66, thus providing an axially deeper space for reception of the gear train. This is done where a large degree of speed reduction is required, in this case 3600/1. With a gear train capable of giving such a high degree of speed reduction three axial levels of gear engagement and location are desirable, rather than the two levels of the previously described embodiments.

The gear train here, as may best be seen from FIG. 11, comprises a fifty-tooth gear 152 journaled in train plate apertures 40 which meshes with the ten-tooth pinion 76, and with which fourteen-tooth pinion 154 rotates. That pinion meshes with twenty-eight-tooth gear 156 journaled in train plate apertures 41, with which rotates twelve-tooth pinion 158. Forty-eight-tooth gear 160 journaled in train plate apertures 44 meshes with pinion 158, and twelve-tooth pinion 162 rotates therewith. Forty-eight tooth gear 164 is journaled in train plate apertures 48, and twelve-tooth pinion 166 rotates therewith. Fifty-four-tooth gear 168 is journaled in train plate apertures 50 and twelve-tooth pinion 170 rotates therewith and meshes with sixty-tooth output shaft gear 88b. As may be seen from FIG. 11, the overlapping of the several gears requires three axial levels therefor, thus necessitating the deeper gear case of FIG. 10.

Any of the gear trains of FIGS. 6, 8 and 11 could be used with any of the specific constructions disclosed, making allowance for modifications in the spacing between the train plates where necessary. Many other specific gear train arrangements, providing for the same or different degrees of speed reduction, could be employed. For example, using the gear plate apertures 46, 42 and 38, and sets of gears having ratios of 9/2, 3/1, 4/1, and 10/3, a speed reduction ratio of 180/1 can be accomplished. Using the train plate apertures 40, 44, 58 and 50, and gear tooth ratios of 5/1, 2/1, 4/1, 9/2 and 5/1, a gear reduction ratio of 900/1 can be accomplished. Using the train plate apertures 44, 48 and 50 and gear tooth ratios of 5/1, 2/1, 9/2 and 5/1, a gear train ratio of 225/1 can be achieved. All of these arrangements and ratios are merely exemplary of the many embodiments which might be employed.

In using the structure and arrangement of the present invention many advantages are achieved. A large number of identical motor-sub-assemblies A can be made and stocked entirely independently of the various output shaft speed requirements which might be involved. The basic elements of the reduction gear sub-assembly B, and particularly the end closures and train plates, will also be identical for all output shaft speed requirements. The fact that the inner train plate 30 supports one end of the motor driving shaft 16 not only reduces the overall expense of the unit but also ensures that the driving pinion 76 will be accurately located relative to the reduction gear train with which it meshes, thus making for efficiency and accuracy of operation with minimum backlash. The output shaft 78 is provided with support at two spaced points, thus permitting it to withstand heavy radial loads. The distance between the axes of the motor driving shaft 16 and output shaft 78 is fixed and predetermined. Means are provided for ensuring adequate lubrication of the journals or bearings of the gear train over a long period of time. The formation of the gear train in a single sub-assembly with one of the end closures of the housing for the combined unit facilitates initial assembly as well as disassembly for repair or replacement of either sub-assembly. Although standard parts are for the most part employed in the construction of the unit, a wide flexibility in the selection of the desired degree of speed reduction is afforded, both as regard initial manufacture as well as subsequent modification in the field. Each set of shaft, pinion and gear used in the gear train can be unitary for maximum strength and reliability, although this is not essential. They can, as disclosed, be mounted directly in the journalling apertures in the train plates or separate bearing mounting can be provided if desired. The construction is available for use with oil filled motors as well as those of more conventional type. Independent lubrication of the motor and of the gear train can be achieved when desired. The overall structure takes up considerably less space and is considerably lighter and less expensive than previous arrangements devised for the same purpose.

While but a limited number of embodiments of the present invention have been here specifically disclosed, it will be apparent that the details thereof may be widely varied without departing from the spirit of the invention as defined in the following claims.

I claim:
1. A gear reduction motor comprising a motor having a driving shaft, a housing within which said motor and driving shaft is received, said housing comprising an end wall spaced from said motor, axially inner and outer train plates in said housing between said end wall and said motor and spaced from one another, an output shaft journaled in at least the outer of said train plates and extending out beyond said end wall, and gear train means mounted on said train plates and operatively connecting said driving shaft with said output shaft, in which at least one of said train plates is formed of lubricant-permeable material, and lubricant reservoir means in engagement therewith, at least some of said gear train means being journaled on said train plate.

2. A gear reduction motor comprising a motor having a driving shaft, a housing within which said motor and driving shaft is received, said housing comprising an end wall spaced from said motor, axially inner and outer train plates in said housing between said end wall and said motor and spaced from one another, an output shaft journaled in at least the outer of said train plates and extending out beyond said end wall, and gear train means mounted on said train plates and operatively connecting said driving shaft with said output shaft, in which said train plates are formed of lubricant-permeable material and provided with cutout areas in which a body of lubricant-absorptive material is received, said gear train means being journaled on said train plates.

3. A gear reduction motor comprising a motor having a driving shaft, a housing within which said motor and driving shaft is received, said housing comprising an end wall spaced from said motor, axially inner and outer train plates in said housing between said end wall and said motor and spaced from one another, an output shaft journaled in at least the outer of said train plates and extending out beyond said end wall, and gear train means mounted on said train plates and operatively connecting said driving shaft with said output shaft, said train plates being provided with a plurality of performed recesses appropriately positioned thereover to receive and mount selected elements defining said gear train means, whereby a variety of different gear trains may be selectively mounted thereon to give a desired dgree of speed reduction, said train plates being formed of lubricant-permeable material, and lubricant reservoir means in engagement therewith, at least some of said gear train means being journaled on said train plate.

4. A gear reduction motor comprising a motor having a driving shaft, a housing wtihin which said motor and driving shaft is received, said housing comprising an end wall spaced from said motor, axially inner and outer train plates in said housing between said end wall and said motor and spaced from one another, an output shaft journaled in at least the outer of said train plates and extending out beyond said end wall, and gear train means mounted on said train plates and operatively connecting said driving shaft with said output shaft, said train plates being provided wtih a plurality of preformed recesses appropriately positioned thereover to receive and mount selected elements defining said gear train means, whereby a variety of different gear trains may be selectively mounted thereon to give a desired degree of speed reduction, said train plates being formed of lubricant-permeable material and provided with cutout areas in which a body of lubricant-absorptive material is received, said gear train means being journaled on said train plates.

5. A gear reduction motor comprising a motor having a driving shaft, a housing within which said motor and driving shaft is received, said housing comprising an end wall spaced from said motor, axially inner and outer train plates in said housing between said end wall and said motor and spaced from one another, an output shaft journaled in both of said train plates and extending out beyond said end wall, and gear train means mounted on said train plates and operatively connecting said driving shaft with said output shaft, in which said train plates are formed of lubricant-permeable material and are provided with cutout areas in which a body of lubricant-absorptive material is received, said gear train means being journaled on said train plates.

References Cited in the file of this patent

UNITED STATES PATENTS

| | | |
|---|---|---|
| 781,062 | Hauss et al. | Jan. 31, 1905 |
| 1,104,223 | Risser | July 21, 1914 |
| 1,173,764 | Baldwin | Feb. 29, 1916 |
| 1,763,302 | Gilbert | June 10, 1930 |
| 2,237,958 | Hansen et al. | Apr. 8, 1941 |
| 2,299,268 | Fisher | Oct. 20, 1942 |
| 2,350,631 | Mitchell | June 6, 1944 |
| 2,362,998 | Harshberger | Nov. 21, 1944 |
| 2,436,231 | Schellens | Feb. 17, 1948 |
| 2,623,406 | Hansen | Dec. 30, 1952 |
| 2,669,881 | Skidmore | Feb. 23, 1954 |
| 2,692,443 | Milligan | Oct. 26, 1954 |
| 2,798,700 | Corbett et al. | July 9, 1957 |
| 2,813,435 | Schumb | Nov. 19, 1957 |
| 2,883,880 | Merkle | Apr. 28, 1959 |

FOREIGN PATENTS

| | | |
|---|---|---|
| 594,954 | Great Britain | Nov. 24, 1947 |
| 1,132,403 | France | Mar. 11, 1957 |